US007958980B2

(12) United States Patent
Seino et al.

(10) Patent No.: US 7,958,980 B2
(45) Date of Patent: Jun. 14, 2011

(54) PROTECTION DEVICE FOR CYLINDER

(75) Inventors: Hideki Seino, Chikugo (JP); Takao Matsumoto, Chikugo (JP)

(73) Assignee: Yanmar Co., Ltd., Osaka (JP)

( * ) Notice: Subject to any disclaimer, the term of this patent is extended or adjusted under 35 U.S.C. 154(b) by 916 days.

(21) Appl. No.: 11/571,342

(22) PCT Filed: Jun. 23, 2005

(86) PCT No.: PCT/JP2005/011564
§ 371 (c)(1),
(2), (4) Date: Oct. 10, 2007

(87) PCT Pub. No.: WO2006/003839
PCT Pub. Date: Jan. 12, 2006

(65) Prior Publication Data

US 2008/0061484 A1 Mar. 13, 2008

(30) Foreign Application Priority Data

Jul. 1, 2004 (JP) ................................ 2004-195835

(51) Int. Cl.
*F16F 9/38* (2006.01)
(52) U.S. Cl. .................... 188/322.12; 74/615; 92/165 R
(58) Field of Classification Search ............. 188/322.12; 92/53, 146, 161, 165 R; 172/508, 813; 74/612, 74/613, 615
See application file for complete search history.

(56) References Cited

U.S. PATENT DOCUMENTS 5,152,351 A * 10/1992 Rieger .......................... 172/813
5,386,652 A * 2/1995 Ramun ......................... 172/813

FOREIGN PATENT DOCUMENTS

| | | | |
|---|---|---|---|
| CN | 2169711 Y | | 6/1994 |
| CN | 2564627 Y | | 8/2003 |
| DE | 2934432 A | * | 3/1981 |
| JP | 62-35071 | | 3/1987 |
| JP | 2-65704 | | 5/1990 |
| JP | 5-38062 | | 5/1993 |

(Continued)

OTHER PUBLICATIONS

Translation of DE 2934432 A, Mar. 1981.*

(Continued)

*Primary Examiner* — Thomas J Williams
(74) *Attorney, Agent, or Firm* — Sterne, Kessler, Goldstein & Fox P.L.L.C.

(57) ABSTRACT

A conventional solid protection device disposed on an exposed side of a cylinder for actuating a working device had a possibility of being permanently deformed by contacting an obstacle so as to be prevented from sliding properly corresponding to the telescopic movement of the hydraulic cylinder. An object of the invention is to provide a hardly deformable protection device. To protect an exposed side of a cylinder for a working device, a protection device includes a guard member and a slide guide into which guard member is telescopically fitted. Slide guide is attached to a cylinder tube, and a tip of guard member is attached to a tip of piston rod. Guard member is a flat plate made of spring steel. A width of guard member is larger than a diameter of the piston rod. Notches are provided on lateral opposite sides of a basic side end of guard member. Sliders are fitted to respective notches. The top of guard member is bent into a roll-shape so as to serve as a pivotal portion.

14 Claims, 11 Drawing Sheets

FOREIGN PATENT DOCUMENTS

| | | | | |
|---|---|---|---|---|
| JP | 07-208408 | | | 8/1995 |
| JP | 09296474 | A | * | 11/1997 |
| JP | 10-292426 | | | 11/1998 |
| JP | 10-292426 | A | | 11/1998 |
| JP | 2000-212994 | | | 8/2000 |
| JP | 2001-073405 | | | 3/2001 |
| JP | 2001-82413 | | | 3/2001 |
| JP | 2001-082414 | A | | 3/2001 |
| JP | 2001082413 | A | * | 3/2001 |
| JP | 2002-13507 | | | 1/2002 |
| JP | 2002-220853 | A | | 8/2002 |

OTHER PUBLICATIONS

Supplementary European Search Report for Application No. EP 05 75 3341; dated Jul. 1, 2008.

* cited by examiner

PROTECTION DEVICE FOR CYLINDER

TECHNICAL FIELD

The invention relates to a protection device for a hydraulic cylinder equipped on a working vehicle such as a backhoe or a loader. Especially, the invention relates to a technology for preventing a rod of the hydraulic cylinder from being damaged.

BACKGROUND ART

Conventionally, a backhoe equipped with an excavation working device is provided with hydraulic cylinders for rotating a boom, an arm, a bucket and another part, respectively. To rotate the boom, for example, a hydraulic cylinder is interposed between an intermediate portion of the boom and a boom bracket. However, the bucket drawn towards an operator causes soil or other foreign matter to stick to a rod of the hydraulic cylinder, so that, when the hydraulic cylinder is subsequently telescoped, the foreign matter damages a seal interposed in the hydraulic cylinder between a cylinder tube and the rod so as to cause problems such as oil leak. Therefore, a cover is provided on a front side of the piston rod of the hydraulic cylinder slidably in the longitudinal direction of the piston rod.

This cover for protecting the rod of the boom cylinder is sectionally V-like sloped so that, when a breaker (or the like) replacing the bucket is rotated to be drawn toward an operator and its tip touches the cover, the tip can easily escape sidewise along the slope of the cover. An example of the cover is disclosed in JP 2002-220853A.

With respect to a bucket cylinder for rotating the bucket, during excavation, the bucket cylinder is disposed on a foremost side so as to easily touch an obstacle. Therefore, a sectionally U-like shaped cover (as disclosed in JP H10-292426A) or a half-pipe-shaped cover (as disclosed in JP 2001-82414A) is provided so as to wholly cover the piston rod of the bucket cylinder from opposite sides.

BRIEF SUMMARY OF THE INVENTION

Problem to be Solved by the Invention

With respect to the above-mentioned conventional arts, each of the sectional V-like, U-like and semicircular shapes of the covers is designed to have rigidity against bending stress. However, it is still possible that each of the covers is permanently or plastically deformed by a concentrated large force or is recessed by a sharp obstacle. When the hydraulic cylinder is telescoped subsequently to the deformation of the cover, the slide of the cover against a cover guide is noisy or stiff. If the deformation of the cover is great, the protection device may be damaged.

Further, if a tip of the piston rod is fixed to the working device by a bolt (or the like), its fixture portion with the bolt may deform the cover when an obstacle contacts the cover. As a result, according to the telescopic movement of the hydraulic cylinder, the permanently deformed cover slides so as to cause twisting or abrasion.

An object of the invention is to provide a protection device including a restorable guard made of spring steel (or the like), which is disposed on a front side of a piston rod. Even if an obstacle touches this guard, the guard is temporarily bent, but it is not permanently deformed. The guard is simply and inexpensively configured so as to prevent an obstacle from directly damaging the piston rod.

Solution

The problem to be solved by the invention is described above. The invention solves the problem in the following way.

In one aspect of the invention, a protection device, disposed on an exposed side of a cylinder for actuating a working device, comprises a guard member and a slide guide into which the guard member is telescopically fitted. In the protection device for the cylinder, the slide guide is attached to a cylinder tube of the cylinder, and the guard member is attached at a tip thereof to a tip of a piston rod of the cylinder. The guard member is made of spring steel.

In a second aspect of the invention, a protection device, disposed on an exposed side of a cylinder for actuating a working device, comprises a guard member and a slide guide into which the guard member is telescopically fitted. In the protection device for the cylinder, the slide guide is attached to a cylinder tube of the cylinder, and the guard member is attached at a tip thereof to a tip of a piston rod of the cylinder. The guard member is made of an elastically deformable flat plate.

In a third aspect of the invention, the guard member has a width that is larger than a diameter of the piston rod.

In a fourth aspect of the invention, the guard member has a base end portion provided on its lateral opposite sides with respective notches for fitting sliders.

In a fifth aspect of the invention, the tip of the guard member is bent into a roll-shape such as to serve as a pivotal portion to be pivoted onto the tip of the piston rod through a shaft member.

In a sixth aspect of the invention, a bush is interposed between the pivotal portion and the shaft member.

In seventh aspect of the invention, a support portion with a slot is provided on the tip of the piston rod so as to pivotally support the shaft member.

In eighth aspect of the invention, the slide guide has mount stays with respective slots, which project from lateral opposite sides of the slide guide. Mount seats are provided on a side surface of the cylinder tube, and project toward the respective mount stays so as to be fixed to the mount stays by respective bolts through the respective slots.

In ninth aspect of the invention, the slide guide has mount stays projecting from lateral opposite sides of the slide guide. Mount seats are provided on a side surface of a base end portion of the cylinder tube apart from a cushion part provided in the cylinder, and project toward the respective mount stays so as to be fixed to the mount stays by respective bolts through the respective slots.

Effects of the Invention

The invention has the following effects.

In one aspect of the invention, during work or another event, even if an obstacle touches the guard member, the guard member is elastically deformed by its elasticity, so that, when the guard member is subsequently released from the obstacle, the guard member restores to the original state. Therefore, the deformation of the guard member, causing the guard member to misfit or damage the slide guide, is solved before the guard member is fitted into the slide guide. In this regard, the conventional guard member has a possibility of yielding to plastic deformation requiring exchange for another guard member. Contrarily, according to the invention, the guard member made of spring steel is elastically deformable so as to have a long life and to require rare maintenances. Even if the guard member touches an obstacle, the spring steel of the guard member functions as a cushion for preventing the piston rod from being damaged.

In a second aspect of the invention, the guard member made of the flat plate is simple and inexpensive. Further, due to the elastic deformability of the flat plate, the guard member deformed by an obstacle contacts the piston rod in a surface or a line, so as to hardly damage the piston rod.

In a third aspect of the invention, the guard member which is wider than the piston rod covers the open side of the piston rod so as to prevent the piston rod from directly touching an obstacle.

In a fourth aspect of the invention, the sliders smoothen the slide of the guard member against the slide guide. The sliders can be surely held by the guard member only by being simply fitted to the notches without another fitting tool. The notches can be easily and inexpensively provided because they are formed on the flat plate.

In a fifth aspect of the invention, the pivotal portion can be inexpensively and simply formed by rolling. When an obstacle touches the guard member, the guard member pivotally supported on the piston rod is elastically deformed and rotates centered on the pivotal portion, thereby preventing its portion attached to the piston rod from being deformed.

In a sixth aspect of the invention, the bush interposed between the guard member and the shaft member reduces the rubbing of the metal members against each other during the rotation and sliding of the guard member, thereby reducing noise, and thereby smoothening the rotation of the guard member relative to the shaft member.

In a seventh aspect of the invention, when the guard member touches an obstacle, the guard member is deformed in such a way that the tip of the guard member slides in the slot toward the piston rod so as to serve as a cushion for reducing a shock onto the guard member. In comparison with the guard member having a fixed tip, it is hard for the guard member to be plastically deformed. The same supporting portion can be used for various cylinders having different sizes, thereby reducing costs.

In an eighth aspect of the invention, when the slide guide is attached to another cylinder having a different size, the slots absorb the size difference. Therefore, the protection device is attachable for cylinders having different sizes. In this way, the protection device is standardized for saving the number of parts and costs.

In a ninth aspect of the invention, even in the case that the cylinder is extended to the maximum stroke and its cylinder tube is deformed by a high stress caused in its cushion part, the mount seats are free from the deformation because they are disposed apart from the cushion part, thereby reducing the stress applied onto welded-joint portions of the mount stays of the slide guide during the telescopic movement of the cylinder.

DETAILED DESCRIPTION OF THE INVENTION

A mode for carrying out the invention will be described.

Figure 1:
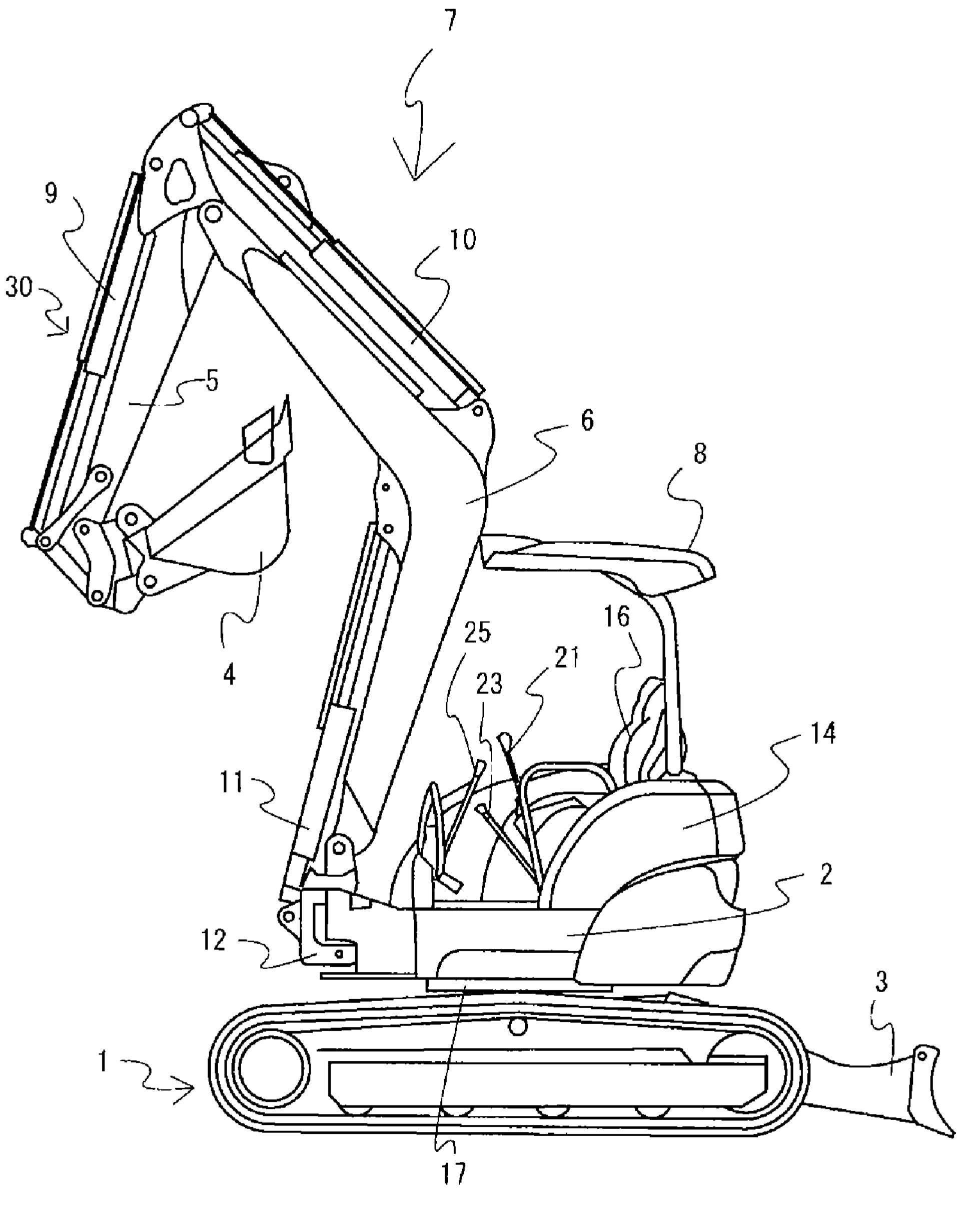
FIG. 1 is a side view of an entire excavation-working vehicle equipped with a protection device according to the invention.

A backhoe serving as an embodiment of an excavation vehicle equipped with a protection device according to the invention. Referring to FIG. 1, the backhoe has a main body whose front portion is equipped thereon with a working device 7. In the main body, a turning frame 2 is laterally swivellably supported on a top center portion of a crawler type traveling device 1 through a turntable bearing 17. A blade 3 is vertically rotatably disposed on one of front and rear sides of crawler type traveling device 1. A bonnet 14 is disposed on the top portion of turning frame 2 so as to cover an engine and others. A driver's seat 16 is disposed on bonnet 14. A hydraulic pressure control lever 21, a lock lever 23 and others are disposed adjacent to driver's seat 16, and a traveling control lever 25, pedals and others are disposed in front of driver's seat 16, so as to constitute a driver's control section. A canopy 8 is disposed above the driver's control section. A boom bracket 12 is laterally rotatably attached onto a front end portion of turning frame 2, and a boom 6 is vertically rotatably supported at a bottom end portion thereof onto boom bracket 12. Boom 6 is substantially doglegged so as to have a forward extended portion from its intermediate bent portion. An arm 5 is rotatably supported on a top portion of boom 6, and a bucket 4 serving as a working attachment is rotatably supported on a tip portion of arm 5. Boom 6, arm 5, bucket 4 and others constitute working device 7.

Boom cylinder 11 is actuated for rotating boom 6, arm cylinder 10 for rotating arm 5, and bucket cylinder 9 for rotating bucket 4. Boom cylinder 11, arm cylinder 10 and bucket cylinder 9 are hydraulic cylinders. Hydraulic pressure control lever 21, the pedal or another operation device disposed in driver's control section 15 is operated for switching a corresponding pilot valve so as to control a corresponding main valve (directive control valve) for supplying pressure oil from a hydraulic pump disposed in bonnet 14 on turning frame 2 to the corresponding hydraulic cylinder through hydraulic pressure hoses, thereby telescoping or rotating the corresponding unit.

A cylinder protection device 30 according to the invention will be described. In the present embodiment, only representative protection device 30 for bucket cylinder (hereinafter, referred to as "hydraulic cylinder") 9 will be described on the assumption that it is adaptable for the other hydraulic cylinders.

Figure 2:
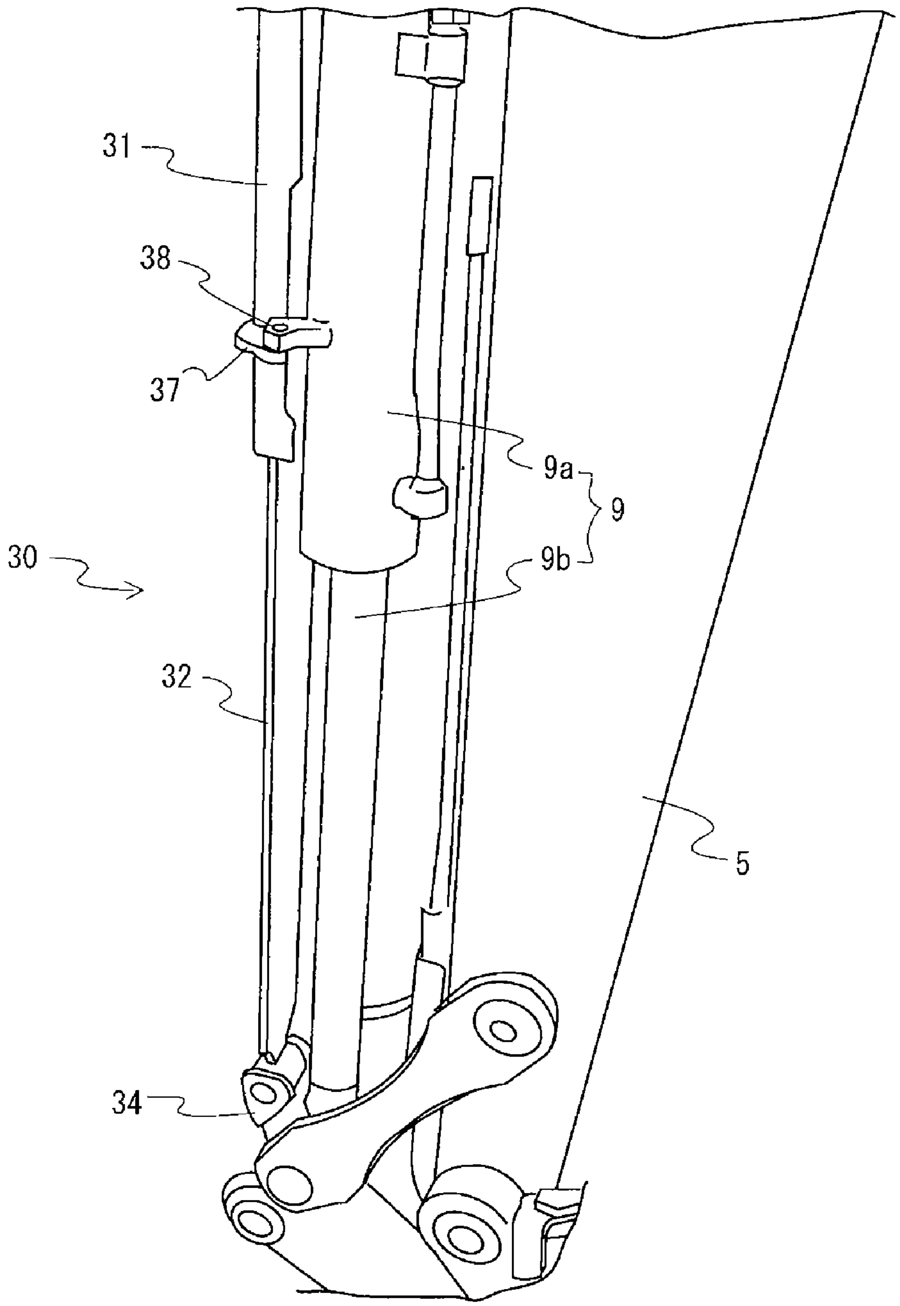
FIG. 2 is a perspective view of an arm provided with the protection device.
Figure 3:
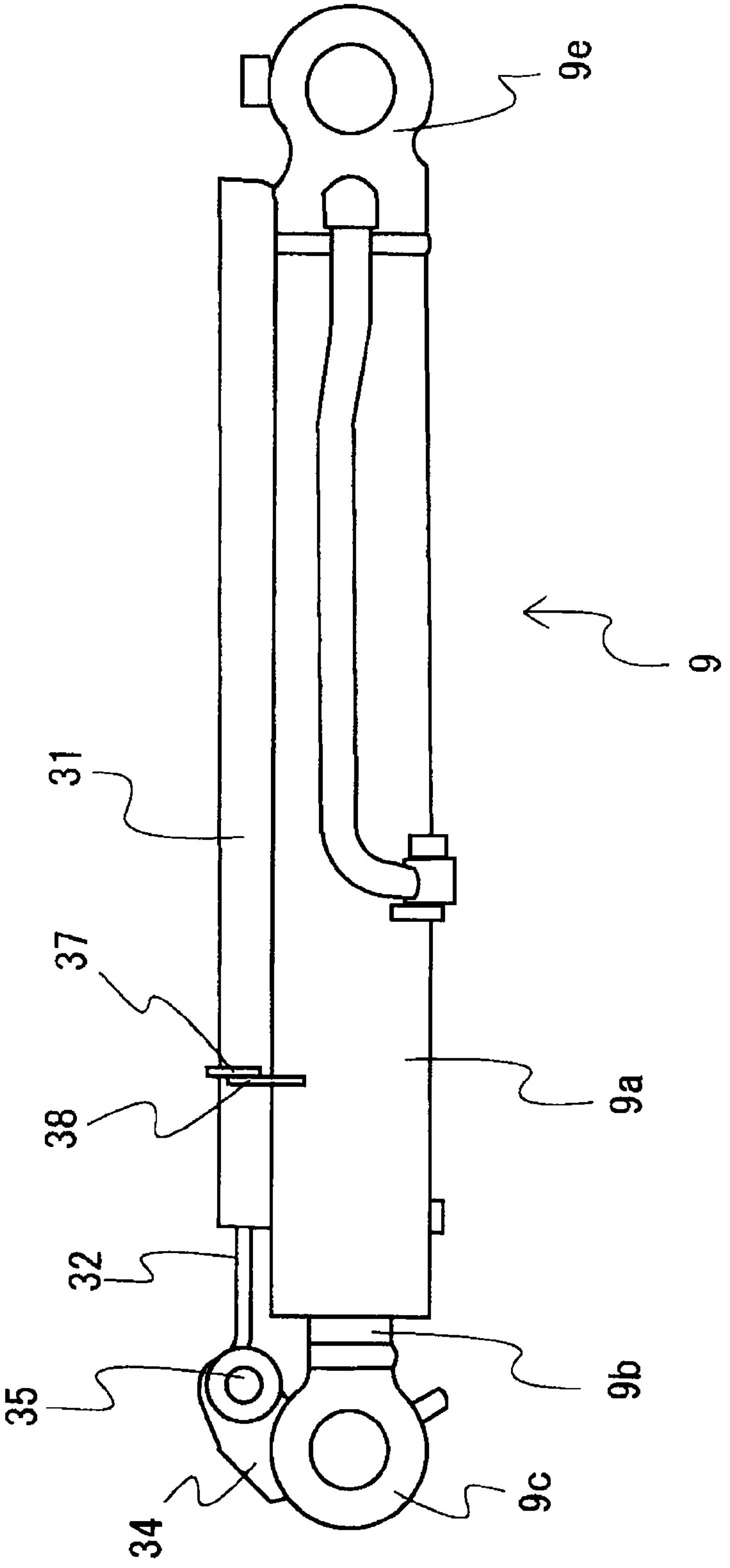
FIG. 3 is a side view of a hydraulic cylinder provided with the protection device.
Figure 8:
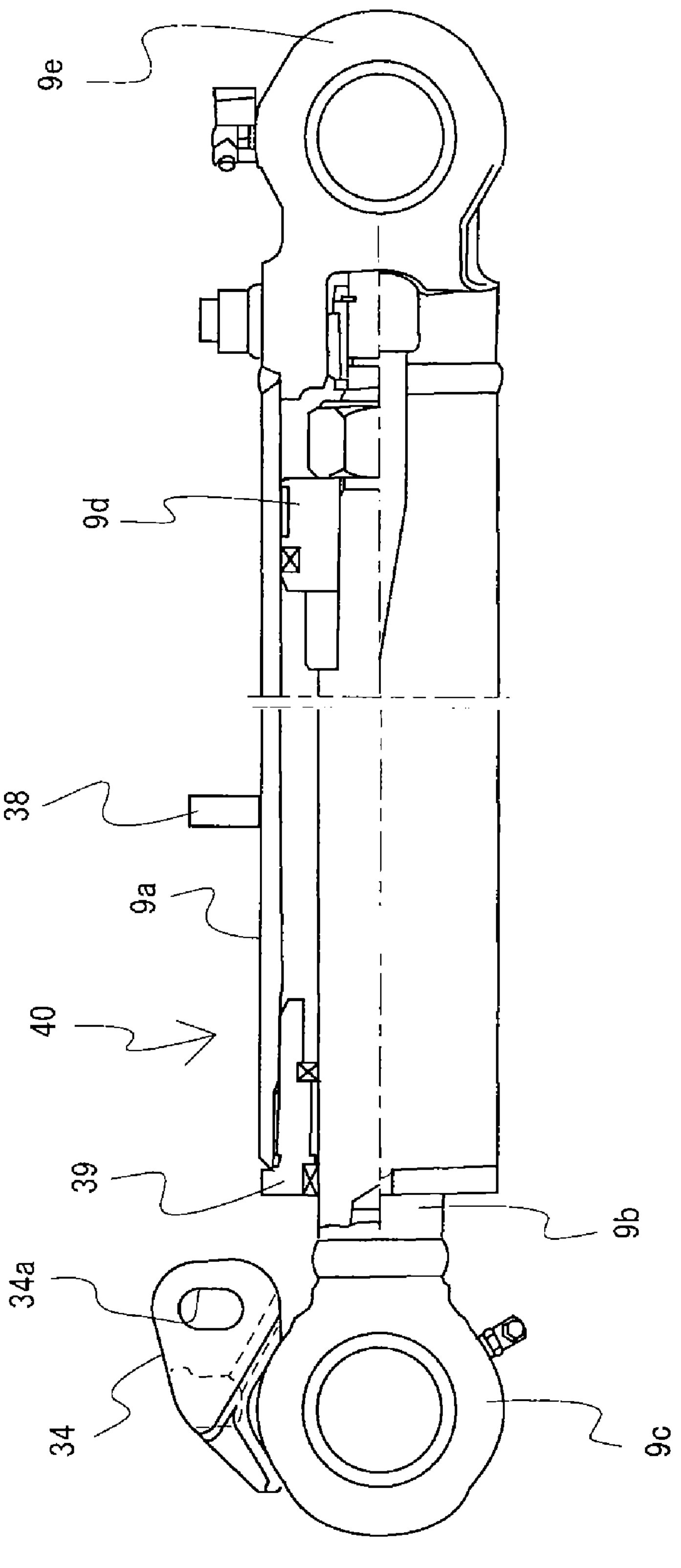
FIG. 8 is a side view partly in section of the hydraulic cylinder.

As shown in FIGS. 2 and 3, protection device 30 includes a slide guide 31 and a guard member 32. As shown in FIG. 8, hydraulic cylinder 9 mainly includes a cylinder tube 9*a*, a piston 9*d* incorporated in cylinder tube 9*a*, and a piston rod 9*b* fixed to piston 9*d* and projecting outward from cylinder tube 9*a*. Slide guide 31 of protection device 30 is attached onto an exposed side of an outer peripheral surface of cylinder tube 9*a*. Guard member 32 is telescopically fitted into slide guide 31, and is attached at a tip thereof onto a support portion 34 provided on a tip of piston rod 9*b*. In this regard, protection device 30 is disposed on an exposed side of the hydraulic cylinder, i.e., opposite to the working device or the main body with respect to the hydraulic cylinder. More specifically, referring to FIG. 1, protection device 30 for bucket cylinder 9 is disposed on the front side of arm 5 (opposite to arm 5 with respect to bucket cylinder 9), and protection device 30 for arm cylinder 10 is disposed on the top side of boom 6 (opposite to boom 6 with respect to arm cylinder 10).

Figure 5:
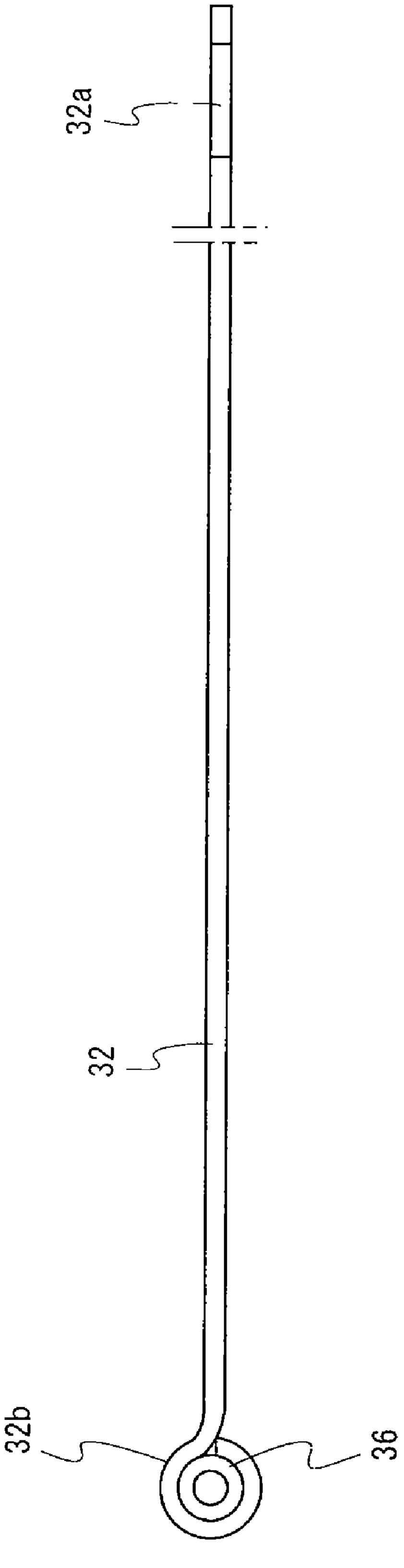
FIG. 5 is a side view of a guard member.
Figure 6:
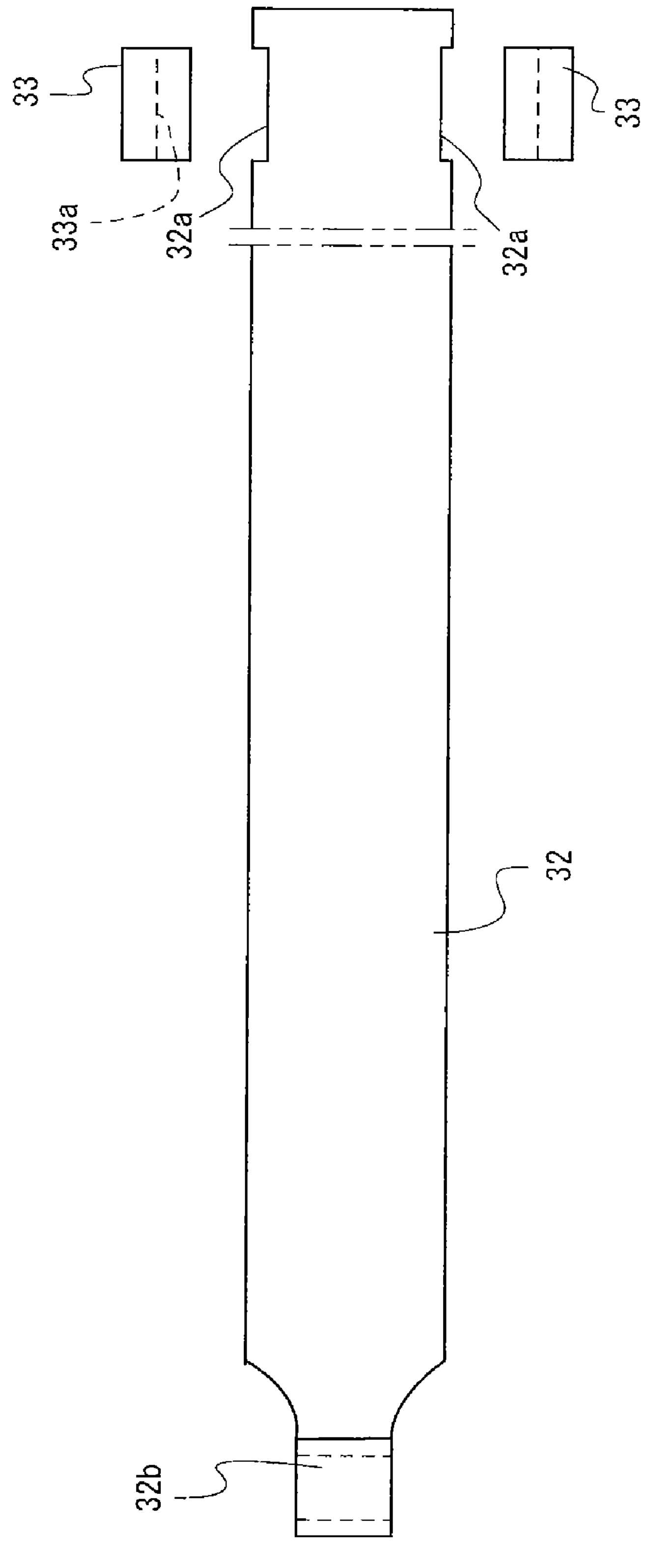
FIG. 6 is a plan view of the guard member.

Guard member 32 is a flat plate made of spring steel, as shown in FIGS. 5 and 6. In other words, guard member 32 is an elastic hard metal strip plate. Guard member 32 is made of spring steel and is elastically deformed by contacting an obstacle, and restored to the original state by releasing the obstacle therefrom. Guard member 32 of the invention is made of the hardly permanently (plastically) deformable material, so as to ensure its smooth slidability. The conventional slidable member has a possibility of being plastically deformed by contacting an obstacle, such as to be prevented from being slidably fitted into slide guide 31. Even if an obstacle touches the guard member, the hardly plastically deformable guard member has only a scratch on its surface. Consequently, the guard member has a long life and requires rare maintenance.

Further, the elastically deformable flat plate of guard member 32 is a commercially available inexpensive member which can be easily cut and bent to form later-discussed notches 32*a* and pivotal portion 32*b*. Moreover, when guard member 32 is pressed and elastically deformed by an obstacle, guard member 32 contacts piston rod 9*b* in a surface or a line, thereby scarcely damaging piston rod 9*b*. Due to the rigidity of piston rod 9*b* required for its own work, guard member 32 has a sufficient rigidity against radial stress. To further reduce the possibility of damaging piston rod 9*b*, a cushion member may be applied onto a back surface of guard member 32 facing piston rod 9*b*. Rubber, foamed resin, elastic synthetic resin or another material serves as the cushion member. A surface of the cushion member is water repellent and smooth so as to avoid mud, dust or the like. When guard member 32 is pressed by an obstacle and abuts against piston rod 9*b*, the cushion member and guard member 32 absorb a shock due to their elasticity, so as to prevent the surface of piston rod 9*b* from being damaged.

Guard member 32 has a longitudinal length that is substantially equal to the longitudinal length of cylinder tube 9*a*. Guard member 32 has a width that is smaller (but may be larger) than the width (diameter) of cylinder tube 9*a* and is larger than the width (diameter) of piston rod 9*b*. Therefore, during the telescopic movement of the hydraulic cylinder, guard member 32 synchronously slides so as to constantly cover the exposed side of piston rod 9*b*, thereby protecting piston rod 9*b* from obstacles.

Figure 4:
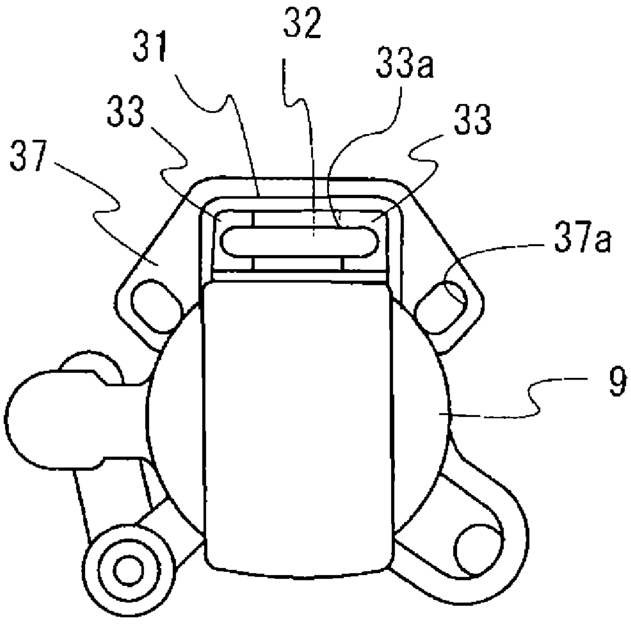
FIG. 4 is a front view of the hydraulic cylinder provided with the protection device.

The end portion of guard member 32 to be fitted into slide guide 31 is referred to as a base end portion of guard member 32. As shown in FIGS. 5 and 6, a pair of notches 32*a* are formed on respective lateral opposite sides of the base end portion of guard member 32 so as to fit respective sliders 33. Each of notches 32*a* is a quadrilateral recess. Each of sliders 33 has a longitudinal length that is equal to the length of notch 32*a*. Each of sliders 33 is sectionally U-like shaped so as to have a groove 33*a* disposed at the middle portion thereof in its thickness direction. Groove 33*a* is extended in the longitudinal direction of slider 33, and has a width that is substantially equal to the thickness of guard member 32. In this way, sliders 33 are fitted onto respective notches 32*a* in lateral directions so as to be easily mounted on guard member 32. Guard member 32 with sliders 33 mounted thereon is inserted into slide guide 31, as shown in FIG. 4, so that, due to sliders 33, guard member 32 can slide without deviation in slide guide 31 while keeping a constant gap from slide guide 31.

The heights of sliders 33 match with heights of respective inner sides of rail-shaped portions of slide guide 31. Sliders 33 fitted to respective notches 32*a* have a width therebetween that is equal to the inner width of slide guide 31. Sliders 33 are made of material, such as synthetic resin, which resists abrasion and shock and is elastically deformable.

Notches 32*a* are easily formed by punching, cutting or other means. Sliders 33 interposed between guard member 32 and slide guide 31 prevent guard member 32 from directly contacting slide guide 31. Therefore, guard member 32 can silently and smoothly slide in slide guide 31. Even if slide guide 31 touches an obstacle and is partly plastically deformed, slider 33 can be elastically deformed during its passing through the plastically deformed portion of slide guide 31 so as to ensure the telescopic movement of guard member 32.

As shown in FIGS. 5 and 6, a tip portion of guard member 32 is bent into a roll-shape serving as a pivotal portion 32*b*, which is pivoted onto support portion 34 provided on the tip of piston rod 9*b* through a pivot shaft 35. The axis of pivot shaft 35 is perpendicular to the longitudinal direction of guard member 32. In this way, pivotal portion 32*b* is easily configured by bending. Due to the pivotal connection between piston rod 9*b* and guard member 32, when guard member 32 is elastically deformed by an obstacle, guard member 32 is rotated centered on pivot shaft 35 so as to prevent its connection portion connected to piston rod 9*b* from being plastically deformed.

In this regard, if the tips of piston rod 9*b* and guard member 32 were solidly joined to each other by a bolt or the like, an obstacle contacting guard member 32 would cause a stress concentrated on the joint portion of guard member 32 so as to bend, i.e., plastically deform guard member 32. The plastically deformed guard member 32 cannot be disposed in parallel to slide guide 31, so that, during the telescopic movement of the hydraulic cylinder, an unfitting force occurs in the mutual slidable fitting portions of guard member 32 and slide guide 31 so as to abrade one or both of guard member 32 and slide guide 31, or to make the telescopic movement of guard member 32 relative to slide guide 31 difficult. Ultimately, the plastic deformation of guard member 32 requires exchange of parts or another repairing work.

A cylindrical bush 36 is interposed between pivotal portion 32*b* and pivot shaft 35. Bush 36 is made of rubber, synthetic resin or the like, and is provide for smoothly rotating guard member 32 relative to pivot shaft 35. Due to bush 36, the noisy rubbing of metals is prevented between pivotal portion 32*b* and pivot shaft 35 during the rotation of guard member 32 or during the slide of guard member 32, thereby silencing the rotation and slide of guard member 32.

Figure 7:
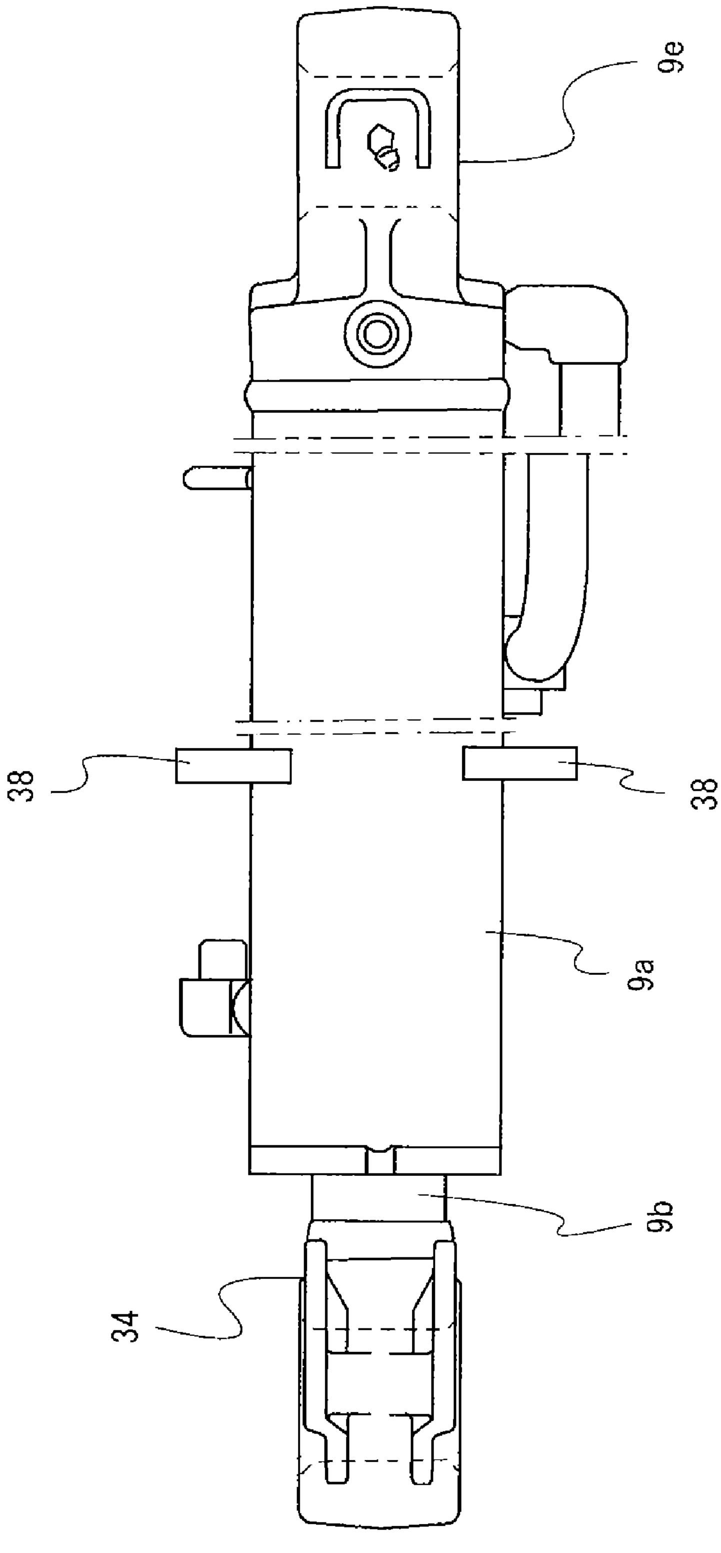
FIG. 7 is a plan view of the hydraulic cylinder.
Figure 9:
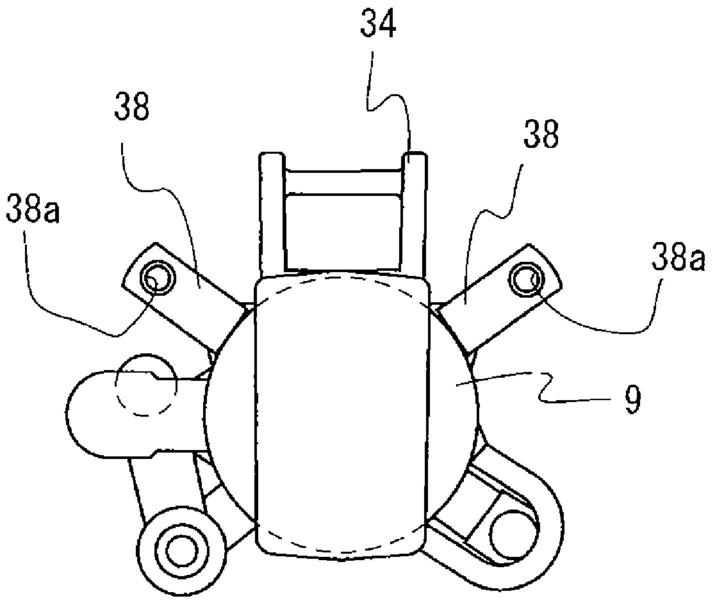
FIG. 9 is a front view of the hydraulic cylinder.

As shown in FIGS. 7, 8 and 9, support portion 34 to be connected to guard member 32 is disposed on a boss portion 9*c* formed at the tip of piston rod 9*b*. Support portion 34 is substantially U-like shaped when viewed in plan, and is integrally fixed to boss portion 9*c* by welding or the like, or detachably attached to boss portion 9*c* by bolts or the like. The integral fixing of support portion 34 to boss portion 9*c* is easy and inexpensive. The detachable attachment of support portion 34 to boss portion 9*c* enables exchange of parts, flexible attachment thereof to another hydraulic cylinder, and reduction of kinds of parts.

Substantially U-like shaped support portion 34 has opposite side plates formed with respective slots 34*a* for supporting pivot shaft 35. Slots 34*a* are extended perpendicular to the axial direction of piston rod 9*b*. In other words, when guard member 32 is attached to support portion 34, slots 34*a* are disposed to extend perpendicularly to the surface of guard member 32. When the protection device is provided on another hydraulic cylinder having a different size, a distance of slide guide 31 from the center axis of the hydraulic cylinder becomes different. Slots 34*a* provided in support portion 34 on the boss portion of the piston rod absorbs the difference of distance of slide guide 31 from the center axis of the hydraulic cylinder. Consequently, the protection device can adjust its distance from the center axis of the hydraulic cylinder so as to constantly dispose guard member 32 in parallel to the center axis of the hydraulic cylinder, thereby preventing guard member 32 from being rubbed against the hydraulic cylinder during their telescopic movement. Further, when guard member 32 contacts an obstacle, the tip of guard member 32 slides along slots 34*a* so as to reduce the deformation of the mutual connection portions of guard member 32 and support portion 34, thereby improving durability of guard member 32.

Figure 10:
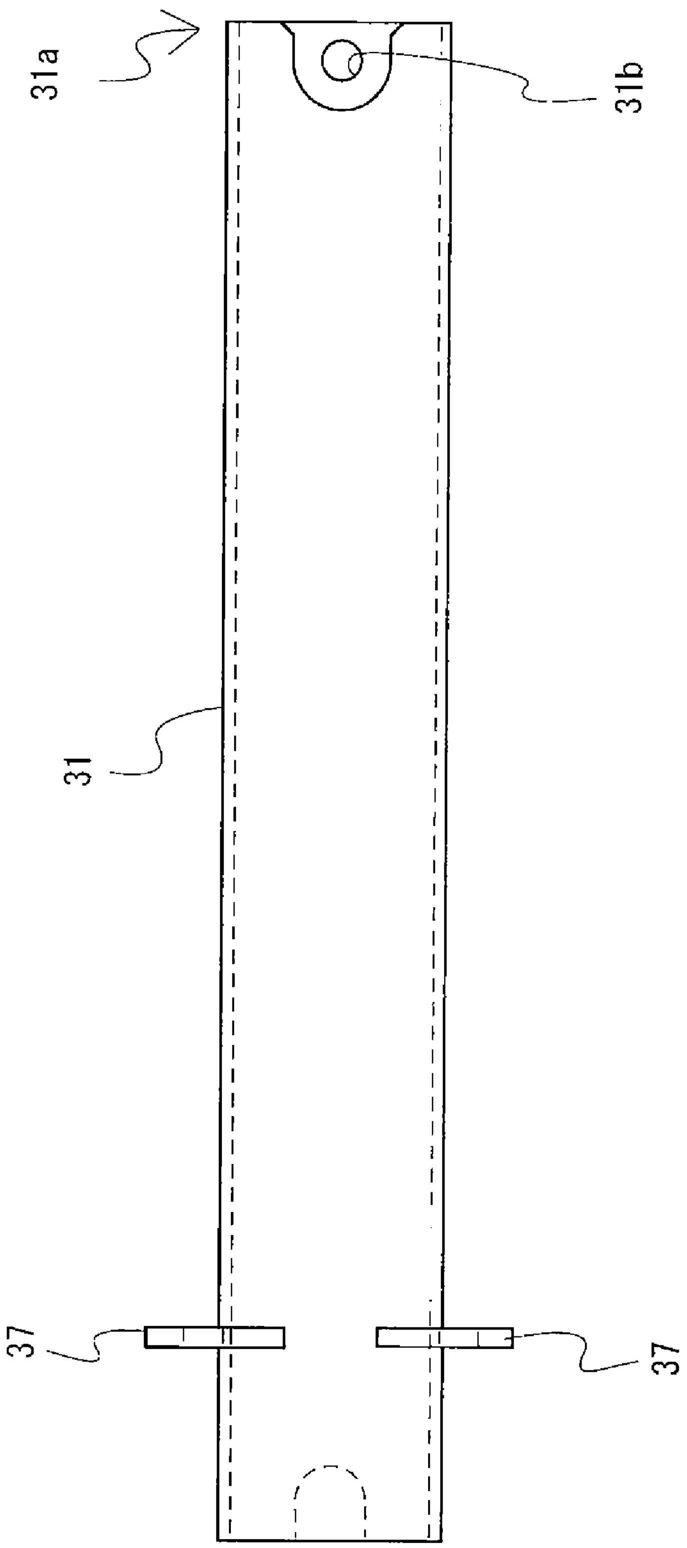
FIG. 10 is a plan view of a slide guide.
Figure 11:
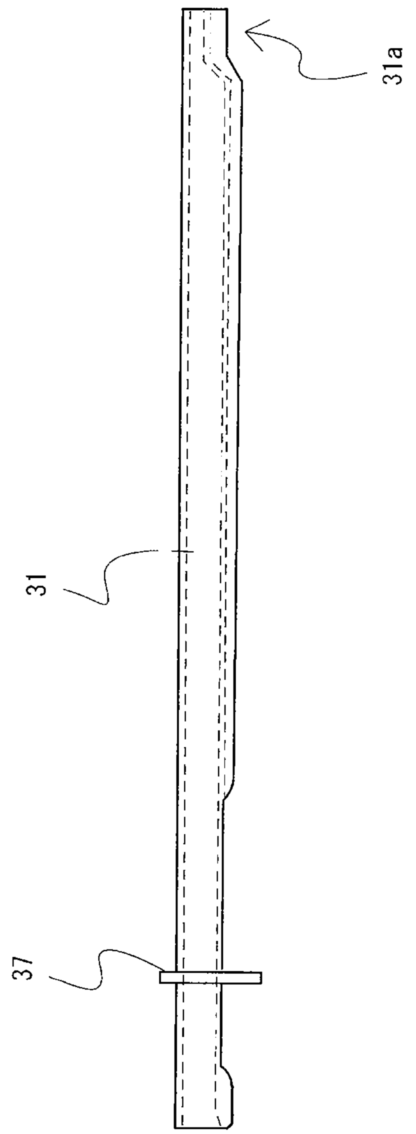
FIG. 11 is a side view of the slide guide.
Figure 12:
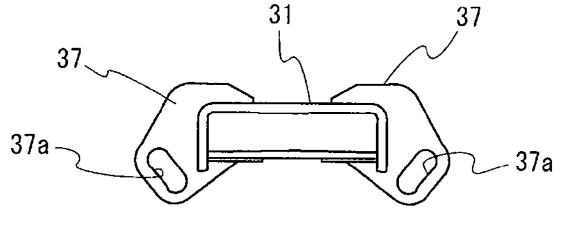
FIG. 12 is a front view of the slide guide.

As shown in FIGS. 10, 11 and 12, slide guide 31 is a flattened square pipe shaped like a sheath. The longitudinal length of slide guide 31 is slightly smaller than the length of cylinder tube 9*a*. The width of slide guide 31 is substantially equal to or smaller than the diameter of cylinder tube 9*a*, and larger than the diameter of piston rod 9*b*. The hollow in slide guide 31 serves as the space into which plate-shaped guard member 32 is fitted.

A mount portion 31*a* on one end (base end) of slide guide 31 is fastened to an outer peripheral surface of a boss portion 9*e* on a base end (head end) of the hydraulic cylinder through a bolt or another fastening member. Mount portion 31*a* on the one end of slide guide 31 is vertically flattened so as to have a small thickness, thereby preventing guard member 32 from passing therethrough. Mount portion 31*a* is bored at the lateral middle portion thereof by a fixture hole 31*b*. The bolt or another fastening member is inserted into fixture hole 31*b* so as to be screwed into the outer peripheral surface of boss portion 9*e*. Slide guide 31 is provided at the other end thereof with an opening, which is widened toward the cylinder tube (downward) so as to easily receive guard member 32.

A mount portion on the other end of slide guide 31 includes a pair of mount stays 37 fixed onto its opposite sides. A pair of mount seats 38 are fixed on an outer peripheral surface of cylinder tube 9*a*, and are adapted to be fastened to respective mount stays 37 through respective bolts or the like. Mount stays 37 fixed on opposite sides of slide guide 31 are arranged downward and outward in lateral opposite directions, i.e., like knitted brows, as shown in FIG. 12. Each of mount stays 37 is provided at a tip portion thereof with a slot 37*a* through which a bolt is inserted for fastening mount seat 38 to mount stay 37. As shown in FIG. 4, each of slots 37*a* is extended in a substantially radial direction of hydraulic cylinder 9 in the state where slide guide 31 is attached to hydraulic cylinder 9. Referring to FIG. 12, separate mount stays 37 are fastened to slide guide 31. Alternatively, as shown in FIG. 4, mount stays 37 may be formed integrally on slide guide 31.

Due to slots 37*a* having the function of absorbing the size differences among hydraulic cylinders, for example, between the bucket cylinder and the arm cylinder, common mount stays 37 can be mounted onto any of the hydraulic cylinders having different sizes, thereby reducing costs.

As shown in FIGS. 7, 8 and 9, plate-shaped mount seats 38 are fixed on the outer peripheral surface of cylinder tube 9*a* and extended outwardly upward in radial directions and in lateral opposite directions, so as to have respective tip portions bored by respective mount holes 38*a*. Mount holes 38*a* are disposed to correspond to respective slots 37*a*, so as to pass respective bolts or the like therethrough for fastening mount seats 38 to mount stays 37.

Mount seats 38, fixed onto the outer peripheral surface of the cylinder tube 9*a* by welding or the like, are located apart from a cushion part 40 disposed in a rod side chamber of hydraulic cylinder 9 adjacent to a rod side cap 39, so that mount seats 38 are nearer to the base end of the cylinder than cushion part 40. Consequently, in the cylinder, a cushioning mechanism is disposed at its telescopic stroke end part, so that the cushioning mechanism cushions the piston when the piston abuts against the cap at its stroke end.

In this cushioning mechanism of the cylinder, a hermetic space is ensured between the cap and the piston adjacent to the stroke end thereof so that, when the piston reaches the stroke end, the hydraulic pressure in the hermetic chamber is compressed so as to function as a cushion, thereby squeezing oil. In this embodiment, the hermetic space is disposed in the rod side chamber so as to serve as cushion part 40. When piston 9*d* reaches the rod side end, the pressure in the hermetic space is increased so as to expand and deform cylinder tube 9*a*. If mount seats 38 were joined to an outer peripheral surface of cushion part 40 by welding, the welded portion of the mount seat would be concentrically stressed so as to be damaged. Therefore, in this embodiment, mount seats 38 are disposed at the position apart from cushion part 40. It may be noticed that mount stays 37 are attached to the outer peripheral surface of cylinder tube 9*a* at the position corresponding to rod side cap 39 apart from cushion part 40. However, the portion of cylinder tube 9*a* corresponding to rod side cap 39 may be subjected to heat deformation caused by welding mount seats 38 thereto so as to make a gap from mount seat 38. In this consideration, mount seat 38 is offset from cushion part 40 toward the base end (bottom end) of the cylinder.

In this way, the outer peripheral surface of the cylinder tube on the end toward the piston rod, onto which slide guide 31 is connected, is offset from cushion part 40 toward the base end of the cylinder tube. Therefore, even if cushion part 40 expands when the piston reaches its stroke end, the welded portions of mount seats 38 are prevented from being deformed, and slide guide 31 is prevented from being deviated, thereby surely guiding guard member 32.

INDUSTRIAL APPLICABILITY

The invention relates a protection device for a hydraulic cylinder provided to a working vehicle such as a backhoe or a loader. Especially, the protection device prevents a rod of the hydraulic cylinder from being damaged.

The invention claimed is:

1. A protection device for a cylinder actuating a working device, the protection device being disposed on an exposed side of the cylinder, wherein the protection device comprises a guard member and a slide guide into which the guard member is telescopically fitted, wherein the slide guide is attached to a cylinder tube of the cylinder, the guard member is attached at a tip thereof to a tip of a piston rod of the cylinder, wherein the guard member is made of an elastically deformable flat plate, and wherein the guard member has a base end portion provided on its lateral opposite sides with respective notches for fitting sliders.

2. The protection device for the cylinder according to claim 1, wherein the guard member has a width that is larger than a diameter of the piston rod.

3. The protection device for the cylinder according to claim 1, wherein the guard member is made of spring steel.

4. A protection device for a cylinder actuating a working device, the protection device being disposed on an exposed side of the cylinder, wherein the protection device comprises a guard member and a slide guide into which the guard member is telescopically fitted, wherein the slide guide is attached to a cylinder tube of the cylinder, the guard member is attached at a rolled tip thereof to a tip of a piston rod of the cylinder, wherein the guard member is made of an elastically deformable flat plate, a portion of the elastically deformable flat plate bending onto itself to form the rolled tip which extends about a pivot shaft that is provided on the tip of the piston rod, wherein the rolled tip of the guard member serves as a pivotal portion to be pivoted onto the tip of the piston rod through the pivot shaft.

5. The protection device for the cylinder according to claim 4, wherein a bush is interposed between the pivotal portion and the shaft member.

6. The protection device for the cylinder according to claim 5, wherein a support portion with a slot is provided on the tip of the piston rod so as to pivotally support the shaft member.

7. The protection device for the cylinder according to claim 4, wherein the guard member is made of spring steel.

8. The protection device for the cylinder according to claim 4, wherein the guard member has a width that is larger than a diameter of the piston rod.

9. A protection device for a cylinder actuating a working device, the protection device being disposed on an exposed side of the cylinder, wherein the protection device comprises a guard member and a slide guide into which the guard member is telescopically fitted, wherein the slide guide is attached to a cylinder tube of the cylinder, the guard member is attached at a tip thereof to a tip of a piston rod of the cylinder, wherein the guard member is made of an elastically deformable flat plate, and wherein the slide guide has mount stays with respective slots, which project from lateral opposite sides of the slide guide, and wherein mount seats are provided on a side surface of the cylinder tube, and project toward the respective mount stays so as to be fixed to the mount stays by respective bolts through the respective slots.

10. The protection device for the cylinder according to claim 9, wherein the guard member is made of spring steel.

11. The protection device for the cylinder according to claim 9, wherein the guard member has a width that is larger than a diameter of the piston rod.

12. A protection device for a cylinder actuating a working device, the protection device being disposed on an exposed side of the cylinder, wherein the protection device comprises a guard member and a slide guide into which the guard member is telescopically fitted, wherein the slide guide is attached to a cylinder tube of the cylinder, the guard member is attached at a tip thereof to a tip of a piston rod of the cylinder, wherein the guard member is made of an elastically deformable flat plate, and wherein the slide guide has mount stays projecting from lateral opposite sides of the slide guide, and wherein mount seats are provided on a side surface of a base end portion of the cylinder tube apart from a cushion part provided in the cylinder, and project toward the respective mount stays so as to be fixed to the mount stays by respective bolts through the respective slots.

13. The protection device for the cylinder according to claim 12, wherein the guard member is made of spring steel.

14. The protection device for the cylinder according to claim 12, wherein the guard member has a width that is larger than a diameter of the piston rod.

* * * * *